April 7, 1959

W. F. PRAEG 2,881,334

ELECTRIC CIRCUIT FOR HIGH-SPEED SPOT OR
SPLIT-SEAM WELDING

Filed Aug. 30, 1956

INVENTOR
Walter Praeg

W. F. PRAEG 2,881,334

ELECTRIC CIRCUIT FOR HIGH-SPEED SPOT OR
SPLIT-SEAM WELDING

Filed Aug. 30, 1956

INVENTOR.
Walter Praeg

United States Patent Office 2,881,334
Patented Apr. 7, 1959

2,881,334

ELECTRIC CIRCUIT FOR HIGH-SPEED SPOT OR SPLIT-SEAM WELDING

Walter F. Praeg, Vancouver, British Columbia, Canada, assignor to Maxim Electronics Ltd., Vancouver, British Columbia, Canada, a corporation of Canada Application August 30, 1956, Serial No. 607,179

12 Claims. (Cl. 307—112)

My invention relates to apparatus for sequentially energizing loads and particularly to spot welding circuits where a large number of welding transformers are involved in order to make spot welds in rapid succession.

Generally such spot-welders utilize condenser discharge circuits or circuits that employ a selected portion of a half cycle, a cycle or several cycles of the commercial 60 cycle alternating current supply.

Besides current wave form, the pressure of the welding electrodes before, during and after current flow, as well as the electrode form and the cleanness of the materials to be welded are of importance.

My invention represents an economical circuit to produce a welding current form superior to the current forms obtained with condenser discharge welding or by utilizing a portion of the commercial 60 cycle sine wave. A portion of this circuit is a modified inverter as described in 1940 by G. W. Mueller-Uhlendorf for the conversion of direct current into alternating current. The advantages of my circuit for high speed spot welding will be apparent from the following.

An object hereof is to provide an efficient, versatile, reliable and relatively simple sequence welding apparatus of the type wherein welding current from a single source is switched to different sets of electrodes in definite sequential order. Another object is to provide such a circuit arrangement wherein the sequence switching may be carried out in direct succession cycle after cycle, in such a manner that initiation of a new cycle terminates current flow in the last stage energized during the preceding cycle, or alternatively wherein the sequence switching may be carried out in such a manner that the successive sequence cycles are time related in some other manner or are unrelated in point of time. In this latter type of operation separate means are provided for terminating the flow of current in the last set of electrodes to be energized during a given cycle independently of the time of initiation of a succeeding cycle.

A specific object is to provide such apparatus wherein the welding current switching is effected very quickly and with minimum loss of energy and minimum loss of time, making it possible to complete the energization of many electrodes very quickly and efficiently. These objectives are of course very important in the case of manufacturing honeycomb or other production material requiring welding to be performed in a very large number of places.

A related object is such apparatus wherein the welding current pulse duration for any of different sets of electrodes may be controlled or varied independently of that for the other sets of electrodes in the same series. Still another object is an arrangement wherein the form of the welding current pulse is improved over previous commercially available apparatus pulse forms, thereby increasing the efficiency of operation, reducing the welding time and making it possible to achieve more consistently reliable results. In this connection the improved apparatus is adapted for monitoring the individual welds, either by recording the welding pulse forms applied to the different sets of electrodes or by otherwise visually indicating the amplitude, or deviations of amplitude from a norm, of the different pulses so as to indicate operating conditions affecting quality of the results.

Certain features of the invention reside in the novel sequence welding circuit using gas tubes for carrying the welding current, or, more specifically as illustrated, a proportional part thereof flowing through a welding transformer primary, and special means for switching off any such gas tube automatically at the instant the succeeding gas tube in the series is switched on by the timing apparatus. Additional features reside in the arrangements by which the switching sequence may be reinitiated automatically, and with such reinitiation terminate the last pulse in the next preceding sequence, or whereby the switching cycles may be terminated by separate means under control of the timing apparatus. Additionally the invention provides an arrangement for conveniently monitoring the flow of welding current in the successively energized electrodes.

These and other features, objects and advantages of the invention will become more fully evident from the following description thereof by reference to the accompanying drawings.

It is commonly recognized that in electrical resistance welding, particularly when thin materials are being welded together, a high current applied for a precisely determined and very short period of time is desired for consistently reliable results.

Figure 1:
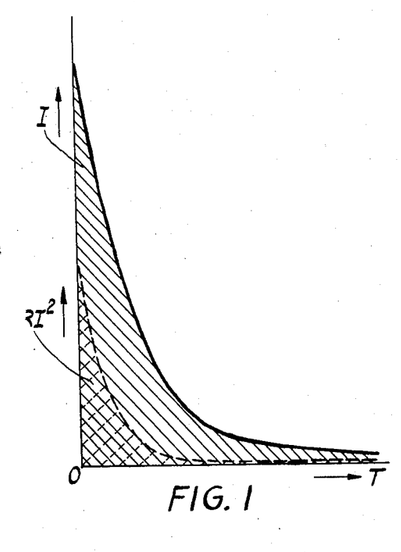
Figure 1 shows in principle the relation of current and energy to time, with a condenser discharge.

A condenser discharge producing a current and energy distribution as shown in Figure 1 has the disadvantage that the current density is high only during a short initial portion of the total discharge period, for the current decay follows an exponential decay function. For a given material to be welded, with a given capacitor and condenser charge voltage, the effective welding current may vary from one welding point to the next depending on resistance variations between the points where the material has to be welded; hence slight variations in surface conditions will result in welds of different qualities.

Figure 2:
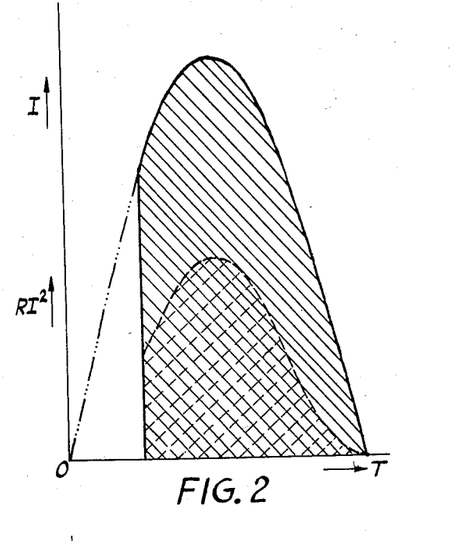
Figure 2 represents a current and energy portion as cut out from a half cycle of the commercial alternating current supply.
Figure 3:
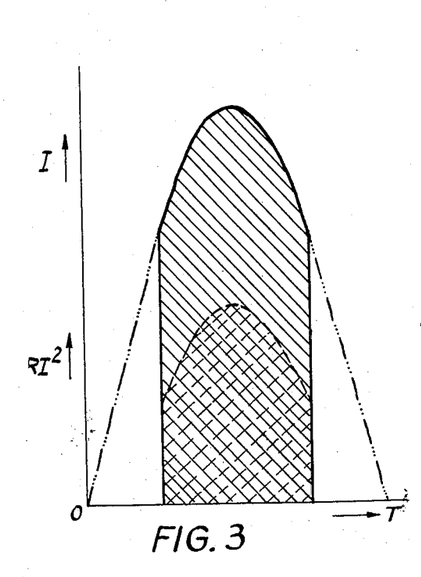
Figure 3 illustrates the current and energy obtained by cutting off on both sides of a half cycle of the commercial alternating current supply.

In many occasions current forms as shown in Figures 2 and 3, representing prior methods of spot welding or the like utilizing selected portions of the sine wave from a commercial alternating current supply, proved superior to the condenser-discharge-current method, for high current density and energy are available over a longer proportion of the total welding current period. These welding current forms are also simpler to be altered, within the limits of a half cycle, as far as amplitude and width are concerned.

Figure 4:
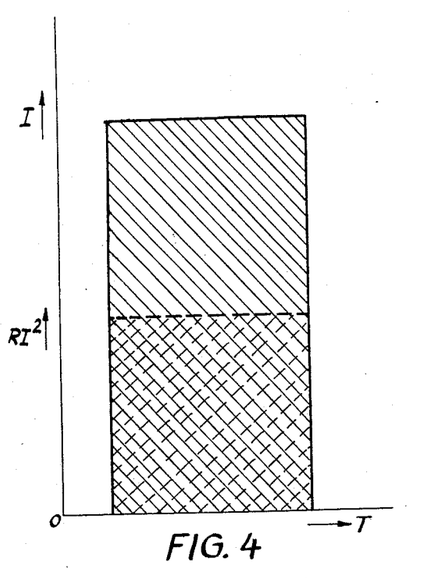
Figure 4 illustrates in principle the current and energy wave form as produced in each one of the welding transformers used in the present circuit.

Figure 4 shows an idealized current form, as used by my invention. This current form has neither of the drawbacks of the before-mentioned types. Any wanted current density is available over any length of time. The closeness to which this ideal form is approached in practice by the present invention is only limited by the characteristics of the welding transformer. To be more specific, the rise time of the welding current, although very steep, is necessarily finite as mainly determined by the stray inductances of the welding transformer, and the ohmic resistances in the primary and secondary circuit. Immaterial deviations from a flat or level top in the wave form are also experienced, determined mostly by the main inductance of the welding transformer and the ohmic resistances in the primary and secondary circuit. The shut-off or decay time, while very short, is necessarily finite, as determined by the relatively short time necessary to charge a blowout condenser, as will be seen later herein.

The circuit disclosed herein may use any number of welding transformers; for instance, in sheet metal honeycomb production, for which it was first designed, a hundred or more welding electrodes may be lined up and their welding transformers energized successively by electronic control from only one direct current power supply, in such manner that equal welding pulses are delivered to each.

Figure 5:
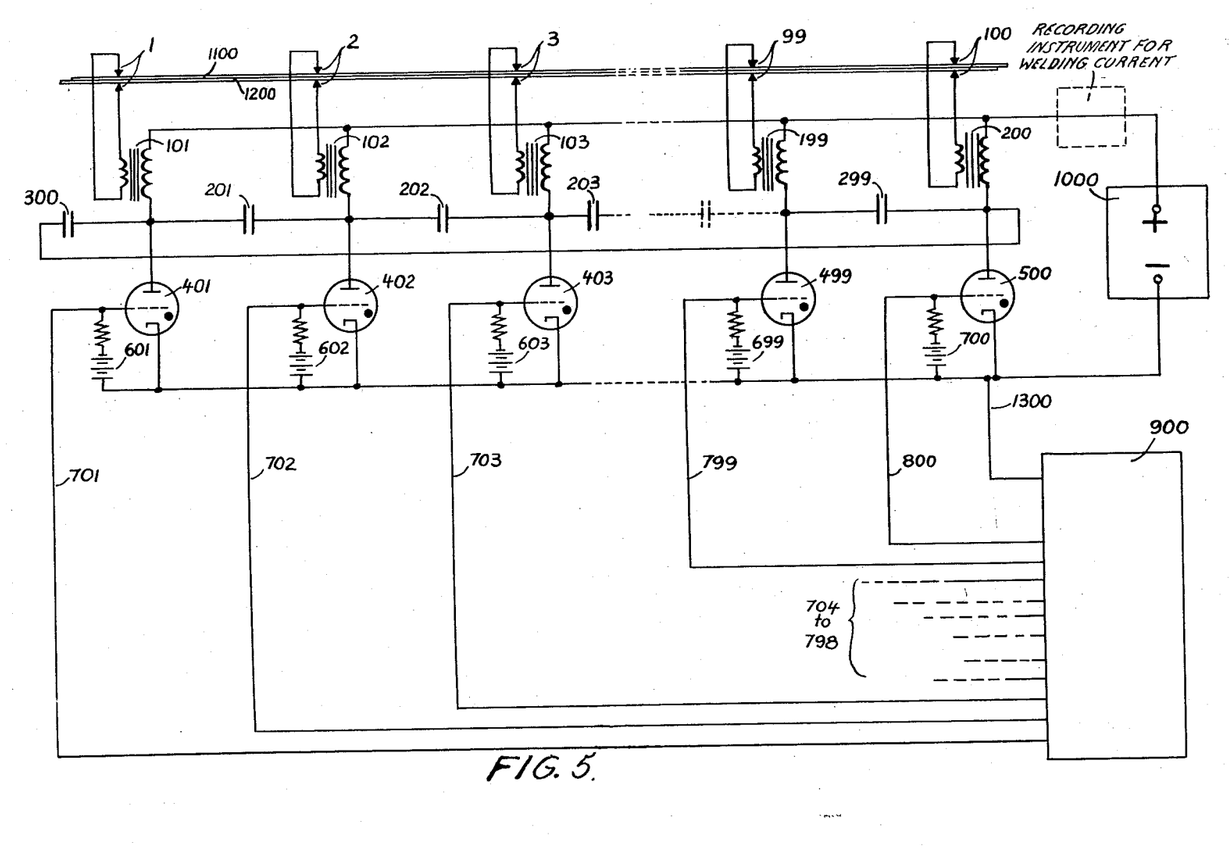
Figure 5 shows a schematic circuit diagram according to the invention.

Referring to Figure 5, five of what is usually a much larger number of welding electrodes, transformers, power tubes, blowout condensers, bias supplies and control lines are shown. It will be understood, however, that any number exceeding one may be employed in practice. Numerals 1, 2, 3, 99 and 100 denote the sets of coacting welding electrodes pressed against opposite sides of the materials to be welded, illustrated as sheets or strips 1100 and 1200. Welding transformers 101, 102, 103, 199 and 200 have their secondary coils connected to the sets of welding electrodes 1, 2, 3, 99 and 100, respectively. At one end the primary coils of all transformers are connected together and to the positive terminal of direct current supply 1000. The other ends of these transformer primary windings are connected to the anodes of gaseous discharge tubes 401, 402, 403, 499, and 500, respectively. These gas tubes may be of the thyratron, ignitron or any equivalent type, having a control grid, or, more generally, a voltage-controlled starter electrode. The capacitors 201, 202, 203, 299 and 300 are connected in series with each other in a closed loop. The junction between capacitors 201 and 202 is connected to the anode of tube 402, that between capacitors 202 and 203 to the anode of tube 403, and so on around the loop, with the anode of each tube in the series being connected to the related junction in the capacitor loop as shown in Figure 5. Numerals 601, 602, 603, 699 and 700 designate bias voltage supplies having negative terminals connected respectively to the grids of tubes 401, 402, 403, 499 and 500 through a suitable grid resistor (unnumbered). The positive terminals of these bias voltage supplies are connected to the respective tube cathodes, keeping these tubes normally nonconductive.

The cathodes of all tubes are interconnected and terminate on the negative pole of power supply 1000.

The reference numeral 900 indicates an electronic control device having a reference or common terminal (not shown) connected by conductor 1300 to the commonly connected cathodes of the power tubes. Control wires 701, 702, 703, 799 and 800 are connected between a series of output terminals (not shown) in the control device and the control grids of the power tubes 401, 402, 403, 499 and 500, respectively. From the control device 900, suitable trigger pulses, one at a time, are impressed in succession on these control grids, momentarily overriding the negative bias normally maintained thereon so as to render the tubes conductive in a definite sequence. The time lapse between any two successive trigger pulses determines the time during which welding current flows through a welding transformer.

Figure 6:
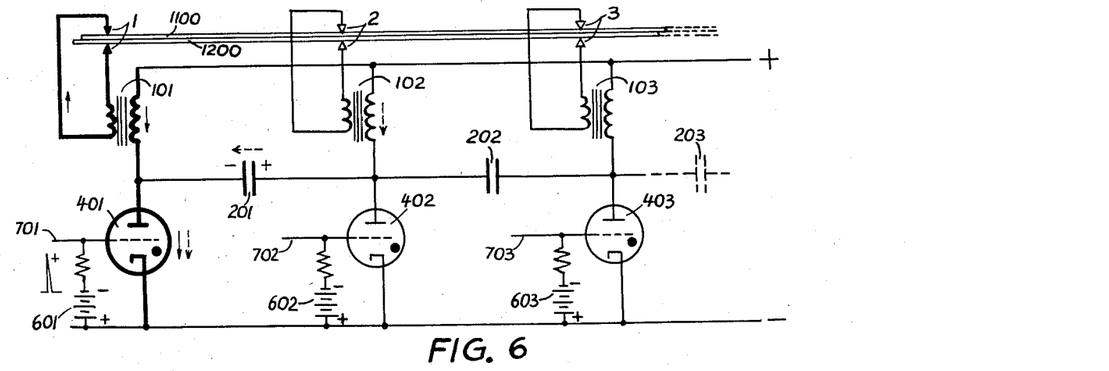
Figures 6 through 8 illustrate operation of the circuit, particularly the transfer of welding current from one welding transformer to the next in the series.
Figure 7:
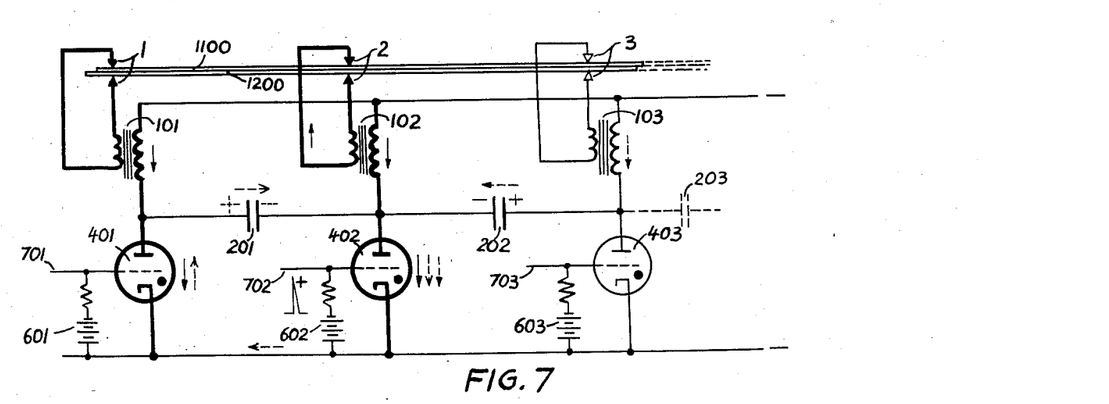
Figure 8:
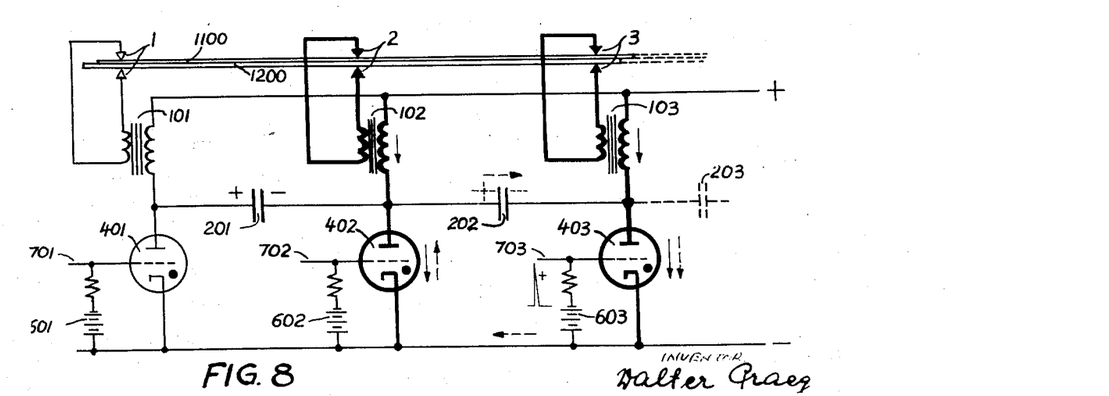

Figures 6 through 8 illustrate the mode of operation of the circuit shown in Figure 5. Referring to Figure 6, a positive trigger pulse has just ionized thyratron 401, initiating flow of current in a circuit including such tube, source 1000 and the primary of welding transformer 101, as indicated by the solid arrows. With the characteristic low voltage drop across conductive gas tube 401 and the full voltage of supply 1000 across nonconductive tube 402, the capacitor 201 is immediately charged to the large resulting potential difference between the anodes of tubes 401 and 402, the charge current flowing in the direction shown by the dotted arrow and producing a condenser charge polarity as indicated. This charge remains constant as does the magnitude of current flow through tube 401 and the primary of transformer 101 except for possible minor variations that may be caused by variations in the resistance in the weld being formed between electrodes 1.

In Figure 7 the next succeeding trigger pulse from control circuit 900 is being impressed on the grid of thyratron 402, initiating conduction in this tube and flow of welding current in the transformer 102. At this instant both tubes 401 and 402 are conducting, and it is therefore desirable immediately to cut off flow in tube 401, which is usually difficult with a gas tube supplying an inductive load. However, it is accomplished efficiently in the circuit described because of the effect of condenser 201. When tube 402 conducts, its anode potential drops abruptly, thereby applying instantaneously across tube 401 a large negative voltage represented by the charge voltage in condenser 201 less the small voltage drop across tube 402. With a sufficiently large condenser 201, tube 401 is thereby deionized. Once 401 is extinguished it cannot conduct again until retriggered on a succeeding cycle of control source 900, because of the bias voltage supplied by 601. Welding current flows now through transformer 102 and tube 402 only.

It will further be noted that during and immediately following extinguishment of tube 401 there is a short period during which energy stored in transformer 101 becomes discharged mainly through the secondary of transformer 101. The stray inductance energy of the primary flows through condenser 201. Current through the primary of transformer 101 continues to flow only until condenser 201 is recharged to the opposite polarity, as shown by the dotted polarity symbols in Figure 7. This terminates the welding current pulse in the work between electrodes 1. When the tube 402 conducts, capacitor 202 is charged to the potential difference between the anodes of tubes 402 and 403, as in the previous instance, the charge current being indicated by the dotted arrow, and the polarity of the charge being also indicated.

Referring to Figure 8, a positive trigger pulse is impressed upon the control grid of tube 403, firing such tube. As described for tube 401, tube 402 will now be extinguished, stopping the welding current through transformer 102. After that the welding current will flow through transformer 103 and tube 403 only. The charge on capacitor 202 as shown in Figure 8 will be neutralized and the capacitor will be charged through 102 and 403 to the opposite polarity from that which it had during the time while tube 403 was conducting.

In the manner as described in Figures 6 through 8 the welding current source will be transferred from one welding transformer to the next one in rapid succession until the entire cycle is completed and all of the electrode sets have been energized. The capacitor charge and discharge currents through the welding transformers are negligible in comparison to the welding currents, for the condensers are of such a size and the circuit impedances are such that the condenser charge and discharge times are only a fraction of the welding time. It will also be evident that, depending on the welding transformers used, the thyratrons or other gas tube switching devices need carry only a fraction of the relatively heavy welding current flowing between any set of electrodes. The source 1000 need supply the welding current for only one set of electrodes, or a sub-group of sets, at a time.

Figure 9:
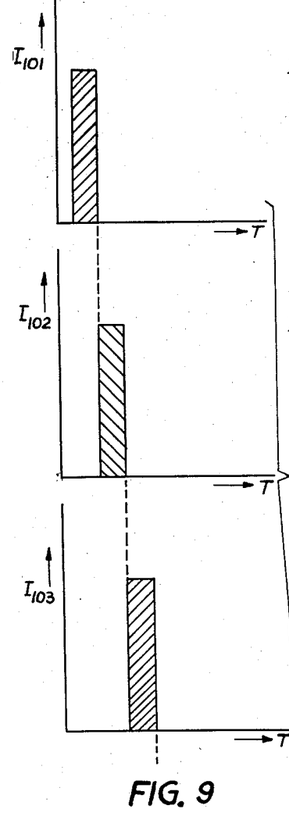
Figures 9 through 11 illustrate the minute control over the time during which welding current flows, or in other words how the welding energy supplied to any or all of the different sets of electrodes can be changed at will.
Figure 10:
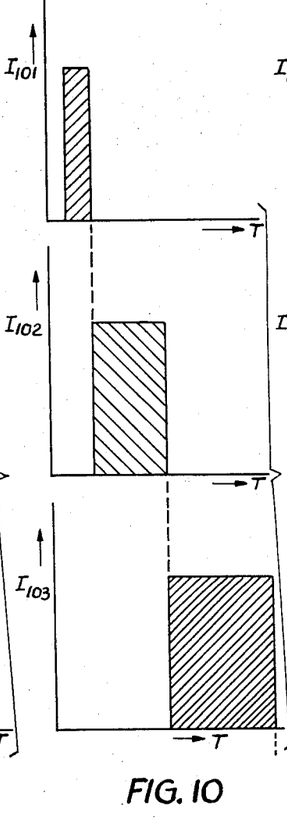
Figure 11:
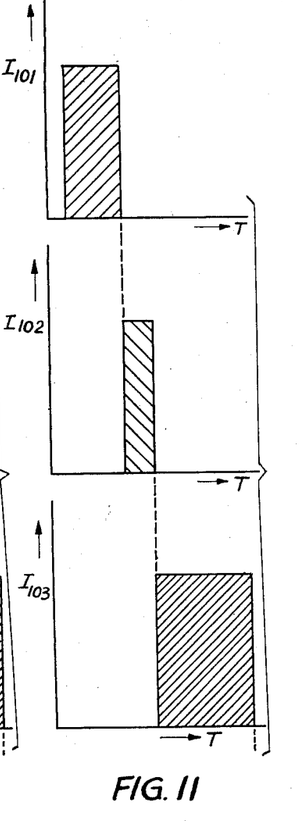

As indicated in Figures 9 through 11 the time during which welding current flows depends only on the time between trigger pulses and any arrangement within the limits of the transformer and tube characteristics is possible. This allows exact power control and an optimum in uniformity of the spot welds made in rapid succession. In Figure 9 the time between trigger pulses is constant, therefore the time during which current flows through the different welding transformers (101, 102, 103, etc.) is the same for each transformer.

In the case of Figure 10 the time between trigger pulses increases, therefore the time during which welding current flows increases from transformer 101 to 102 and again from 102 to 103.

As shown in Figure 11 the time between trigger pulses decreases and increases; the time during which current flows through transformer 101 is longer than the time during which current flows through transformer 102 and the time during which current flows through 103 is longer than the "on" time of the current through 101 or 102.

Figure 12:
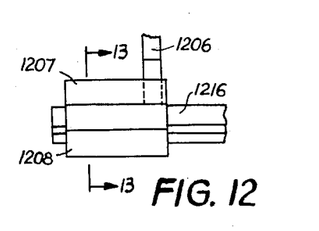
Figure 12 is an elevational view of welding electrodes and a piece of honeycomb comprising sinuous sheet metal strips to be welded by the same.
Figure 13:
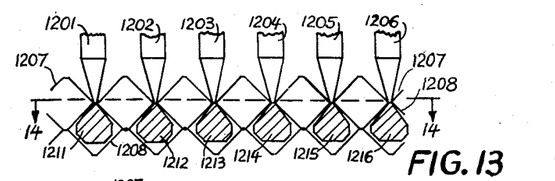
Figure 13 is a sectional view taken on line 13—13 of Figure 12.
Figure 14:
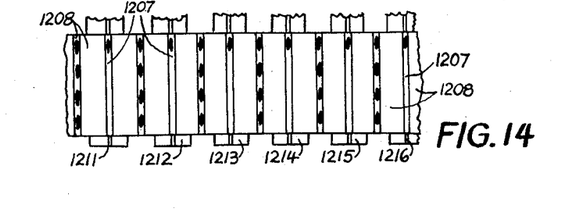
Figure 14 represents a sectional view taken on line 14—14 of Figure 13.

Figures 12 through 14 demonstrate how, by means of this welding circuit, honeycomb is manufactured. Outer electrodes 1201 through 1206 bear against the outer side of the work, pressing the preformed honeycomb strip 1207 against the already welded honeycombs 1208. Inside the already welded honeycombs 1208 are the other welding electrodes 1211 through 1216. There is always a pair of electrodes, i.e. 1201 and 1211, 1202 and 1212, etc., connected to the secondary of a welding transformer in a welding circuit corresponding to Figure 5 and one welding point after the other is made as described previously, thus making one row of spot welds after the other. If enough electrodes are involved, the electrodes that have completed welds in one row might be moved to a position beside the spot weld they have already made, while the remaining electrodes of this row keep on welding one after the other so that after one row of welds is made there will already be electrodes in position for starting a new row of welds, and current from the last welding transformer (in Figure 5 transformer 200) may be transferred back to the first welding transformer (in Figure 5 transformer 101) and the next row of spot welds started without loss of time. While the first spots of the new row are welded successively the other electrodes are moved from the first row to the second one. Each strip 1207 may require one or more rows of spot welds for adequate securement thereof to the honeycombs. After the last point of the honeycomb strip 1207 is welded to the honeycombs 1208 the welding current is shut off by disconnecting the positive pole from the direct current power supply (1000 in Figure 5) and a new prefabricated honeycomb strip is placed between the welding electrodes and welded to the honeycomb as described.

Figure 14 shows how, with a series of spot or split seam welds, the honeycomb is welded together, and the manner in which the new honeycomb strip is welded to it, namely, by welding one row of spot or split seam welds after the other. As shown, the electrodes have just welded the first row of the new honeycomb strip. If the time to weld one row is so short that the electrodes which have welded cannot be moved to the next row while the rest of the electrodes finish the welds of the first row, all electrodes remain in the first row and after the welds are completed the current is shut off and the electrodes move together to the next row to be welded.

In Figure 5 the switching circuit is in the form of a ring, wherein the last tube 500 is extinguished by restarting of the first tube 401 for successive cycles of operation without interruption. However, in certain applications it is desired to terminate the operation at the end of each cycle so that separate welding sequences may be performed independently. Circuits to shut off the welding current after the last weld of a row or sequence is made are shown in Figures 15 through 17.

Figure 15:
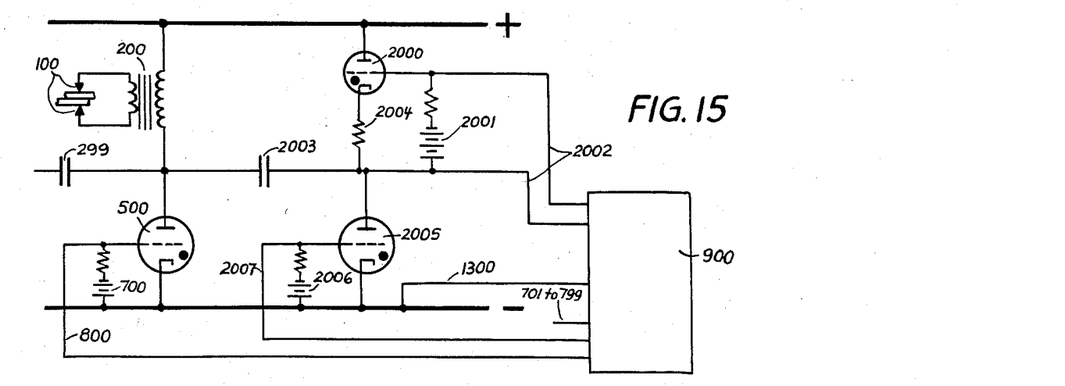
Figures 15 through 17 show different alternative circuits according to the invention and by which welding current may be interrupted, if desired, after all welding transformers have been energized one after the other to complete one cycle of operation of the apparatus.

In Figure 15 numeral 100 denotes the last pair of electrodes in a row of electrodes, the particular set 100 being connected to welding transformer 200. A gas tube 2005 is connected in the relative position of switch tubes 401, 402, etc., but at a point beyond the last stage 500, to which its anode is coupled by a condenser 2003 similar to condenser 299. A gas tube 2000 is connected between the positive bus and the anode of tube 2005 as shown. Shortly after a positive trigger pulse applied by means of wires 1300 and 800 to the grid of the tube 500 has ionized this tube and welding current has started to flow through this transformer, a positive pulse is impressed on the control grid of a gas tube 2000 by means of wires 2002, firing tube 2000. Normally the grid of this tube is negatively biased by a source 2001 beyond conduction. From the positive side of the main power supply 900 a current flows through triggered tube 2000, and current-limiting resistor 2004 connected between its cathode and the anode of a gas tube 2005. Because tube 500 still conducts, current charging capacitor 2003 flows through tube 500 back to negative. Tube 2000 is extinguished after capacitor 2003 becomes charged to the point that the voltage drop across tube 2000 can no longer maintain ionization in such tube. The side of condenser 2003 connected to the anode of tube 2005 is then nearly at the potential of the positive bus. Whenever the current through transformer 200, the last transformer energized in a row of spot welds, has to be stopped, a pulse from the electronic control 900 is impressed via wires 2007 and 1300 between grid and cathode of tube 2005 thus ionizing this tube and immediately dropping the potential on the side of condenser 2003 connected to the anode of tube 2005. This drop of potential renders the anode of tube 500 negative due to the fact that the charge on condenser 2003 cannot immediately change. As a result of its reversed anode voltage tube 500 can no longer conduct. Inductance energy stored in transformer 200 discharges through condenser 2003. The condenser discharges and then recharges to the opposite polarity. One row of spot welds is now completed and since the electronic control 900 does not fire the first tube again all transformers remain deenergized until a subsequent cycle of operation is initiated.

Figure 16:
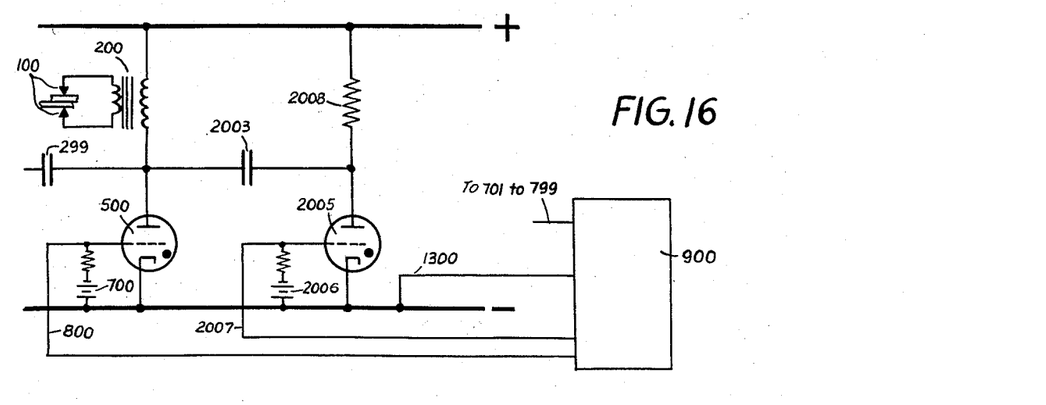
Figure 17:
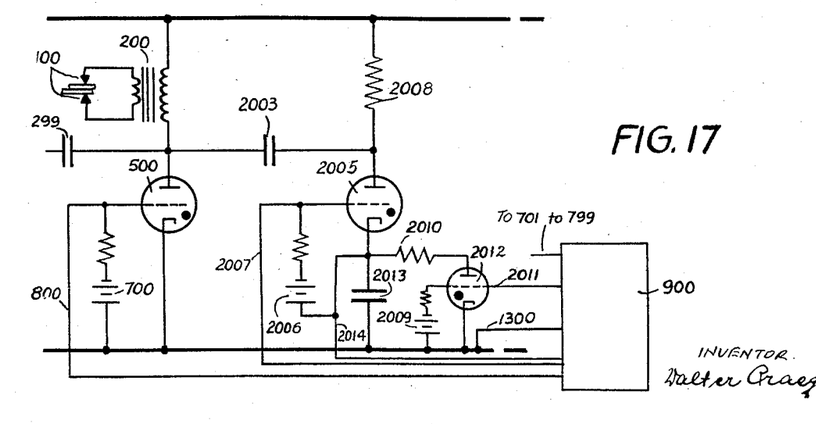

The circuit of Figure 16 serves the same purpose as that in Figure 15, namely, as a device to terminate flow of welding current in the last transformer by extinguishing the gas tube carrying such current. As soon as a positive trigger pulse, impressed across grid and cathode of tube 500, overcomes the bias of source 700 and tube 500 is ionized current starts to flow through transformer 200, the last transformer in a row of welding transformers which have been energized in sequence. At the same instant blowout capacitor 2003 begins to be charged through impedance 2008, which may be resistive, inductive or both, substituting for gas tube 1000. Any time after capacitor 2003 has been sufficiently charged a trigger pulse from electronic control 900 impressed, by means of wires 2007 and 1300, across grid and cathode of tube 2005 will ionize the tube, thereby abruptly reversing the polarity of the potential across tube 500 thereby extinguishing tube 500. Impedance 2008 is dimensioned so that the current through tube 2005 is not, after the fast discharge of capacitor 2003, sufficient to keep the tube in a conductive state. Since no more trigger pulses come from electronic control 900 after one row of spot welds is completed, all transformers remain deenergized and the welding electrodes can be moved.

This circuit, especially when using impedance 2008 in lieu of a gas tube 2000, is only suitable when welding currents of relative long duration are involved, for the resistance value necessary to assure that tube 2005 does not stay ionized determines the charge time for capacitor 2003.

Figure 17 shows another circuit to stop the flow of current in the last welding transformer of a row. In this circuit, after tube 500 has been ionized by a trigger pulse supplied via wires 800 and 1300, welding current starts to flow through transformer 200 and tube 500. At the same time capacitor 2003 starts to be charged to the voltage of the main direct current supply through 2008 minus the relatively small voltage drop across tube 500.

When the welding current through electrodes 100 has to be stopped a trigger pulse is impressed across grid and cathode of tube 2005 by means of wires 2007 and 2014. Capacitor 2003 discharges through tube 2005 and capacitor 2013 connected between the negative bus and the cathode of tube 2005, thereby extinguishing tube 500 when tube 2005 is triggered on. Capacitors 2003 and 2013 are preferably equal and twice as large as capacitors 201 through 299, but this is not necessary and they may have any suitable size.

Tube 2005 becomes extinguished after capacitor 2013 becomes substantially charged. After tubes 500 and 2005 are extinguished capacitor 2013 stays charged to a voltage somewhat smaller than the voltage that was across capacitor 2003 before it discharged into capcitor 2013. Capacitor 2013 can be discharged any time after tube 2005 has deionized, preferably after the welding eletrodes have been moved to their new position and before the new welding series is started, by triggering a discharge tube 2012 connected across it. Tube 2012 has a current-limiting resistance 2010 connected in series therewith, and a negative grid bias source 2009 and connections similar to the other gas tubes. The trigger pulse to this tube is supplied from source 900 through wires 2011 and 1300.

The trigger pulse source 900 is not described, for such circuits and the various available means for timing and controlling their operation are well known in the art. The lines marked 701 to 799 in Figures 15 through 17 indicate the shielded interconnecting wires to the grids of the other welding current handling tubes 401 to 499.

It may be pointed out that there is no time loss while transferring from one welding transformer to the other and that the amplitude of the welding current can easily be adjusted by altering the output voltage of direct current supply 1000. The power supply 1000 serves only one transformer at a time and can therefore be kept relatively small. For successive welding points on the same materials having similar surface conditions on the different spots to be welded, the same type of electrodes and the same electrode-pressure, the welding current, supplied by the same source, should be the same for each spot weld; therefore, a recording instrument in series with the common direct current supply, as indicated with dotted lines on Figure 5, can be used to obtain a record of the welding currents feeding into the welding transformers in sequence. This graphical record represents a means of quality control, for too low a current would indicate that a proper weld was not made on that particular spot, while too high a current might indicate that the electrode pressure was too high and a hole might have been burned in the materials being welded or no weld at all has been made. In place of a recorder, other means of indication might be used to show when the welding current on a spot weld differs from the normal value.

The described welding circuits can easily be adapted for automatic or semi-automatic welding machines for the manufacture of honeycomb or other industrial applications where a large number of welding electrodes have to be energized in sequence.

I claim as my invention:

1. Sequentially operated apparatus comprising in combination with a plurality of loads to be energized, a source of direct current, transformers having secondaries connected to the respective loads and having primaries adapted for successive energization by said source, and means for connecting said primaries to said source successively and for predetermined load energization periods desired for the different loads, respectively, said means comprising a plurality of gaseous discharge tubes having a starting electrode, and having main electrodes connected serially with said source and with the respective transformer primaries, one such tube being the first and another being the last in the series, a plurality of capacitances being individually connected between corresponding main electrodes of the successive tubes from the first to the last in the series, said corresponding main electrodes being also connected to one end of the respective transformer primaries, means providing bias potential on the respective starting electrodes, normally preventing conduction in said tubes, timing means comprising a source of starting pulses connected to the respective starting electrodes and adapted to start conduction in the tubes in successive order with predetermined timed relationship, commencing with the first and continuing to the last tube in the series, conduction in any one tube, from the first to the next-to-last in the series, charging the capacitance connected between it and the succeeding tube in the series, whereby the starting of conduction in such succeeding tube extinguishes conduction in said one tube through said charged capacitance and whereby said capacitance provides a path for discharge of self-inductance energy in the transformer connected to said one tube, and means operable to extinguish conduction in the last tube in the series at a predetermined time following initiation of conduction in such last tube.

2. The apparatus combination defined in claim 1, wherein the last-mentioned means, operable to extinguish conduction in the last tube in the series, comprises in part a capacitance connected between the corresponding main electrodes of the first and last tubes in the series, and in part the first tube itself and the timing means starting conduction in said first tube to initiate a succeeding load energization sequence, as in the case of the other tubes in the series.

3. The apparatus combination defined in claim 1, wherein the last-mentioned means, operable to extinguish conduction in the last tube in the series, comprises a capacitance connected at one end to said corresponding main electrode of the last tube in the series, means connected to the opposite end of said capacitance and maintaining the same normally at a substantially constant potential during the period of conduction in said last tube, whereby said capacitance becomes charged during such period, and conductive means operable at a predetermined time following initiation of conduction in said last tube to materially and abruptly change the potential at said opposite end of the capacitance and thereby at said last tube's corresponding electrode in a sense and by an amount to extinguish conduction therein, said conductive means thereafter permitting flow of current therein through said capacitance by discharge of self-inductance energy stored in the last transformer.

4. The apparatus defined in claim 3, wherein the means connected to the opposite end of the capacitance comprises a resistance element and a source of positive direct potential connected to the opposite end of such resistance element, and the conductive means comprises a gaseous discharge tube having a starting electrode connected to be triggered by the timing means, and having an anode connected to the first end of said resistance element and a cathode connected to a point of negative direct potential, whereby triggering of said latter gaseous discharge tube extinguishes conduction in the last tube in the series, the value of said resistance element precluding continuing conduction in said latter gaseous discharge tube after conduction has been extinguished thereby in the last tube in the series.

5. The apparatus defined in claim 3, wherein the means connected to the opposite end of the capacitance comprises an impedance element and a source of positive direct potential connected to the opposite end of such impedance element, and the conductive means comprises a gaseous discharge tube having a starting electrode connected to be triggered by the timing means, and having an anode connected to the first end of said impedance element and a cathode connected to a point of negative direct potential, whereby triggering of said latter gaseous discharge tube extinguishes conduction in the last tube in the series, a capacitance interposed between the cathode of said latter gaseous discharge tube and said point of negative potential for blocking continuous direct current flow in the tube after it has extinguished conduction of the last tube in the series, and means for draining residual charge from this interposed capacitance thereafter.

6. In combination with a plurality of loads to be successively energized, a source of load direct current, load transformers having secondaries connected to the respective loads and having primaries adapted for successive energization by said source, and means for connecting said primaries to said source successively and for predetermined load energization periods desired for the different loads, respectively, said means comprising a plurality of gaseous discharge tubes having a starting electrode, and having main electrodes connected serially with said source and with the respective transformer primaries, one such tube being the first and another being the last in the series, means providing bias potential on the respective starting electrodes, normally preventing conduction in said tubes, timing means comprising a source of starting pulses connected to the respective starting electrodes and adapted to start conduction in the tubes in successive order with predetermined timed relationship, commencing with the first and continuing to the last tube in the series, means connected to corresponding main electrodes of the respective tubes from the first to the next-to-last and operable to change the potential thereof in a sense and by an amount extinguishing conduction in each such tube substantially instantly upon initiation of conduction in the next succeeding tube, and means connected to the last tube in the series and operable to extinguish conduction therein at a predetermined time following initiation of conduction in such last tube.

7. In a sequence welding apparatus comprising a plurality of separate welding circuit devices serially arranged to produce successive welds in work, and a direct current source, said devices being adapted for successive energization by said source; means for connecting said devices to said source successively and for predetermined welding periods desired for the different devices, respectively, said means comprising a plurality of gaseous discharge tubes having a starting electrode, and having main electrodes connected serially with said source and with the respective devices, one such tube being the first and another being the last in the series, means providing bias potential on the respective starting electrodes, normally preventing conduction in said tubes, timing means comprising a source of starting pulses connected to the respective starting electrodes and adapted to start conduction in the tubes in successive order with predetermined timed relationship, commencing with the first and continuing to the last tube in the series, means connected to corresponding main electrodes of the respective tubes from the first to the next-to-last and operable to change the potential thereof in a sense and by an amount extinguishing conduction in each such tube substantially instantly upon initiation of conduction in the next succeeding tube, and means connected to the last tube in the series and operable to extinguish conduction therein at a predetermined time following initiation of conduction in such last tube.

8. In a sequence welding apparatus comprising a plurality of separate welding circuit devices serially arranged to produce successive welds in work, and a direct current source of welding current, said devices being adapted for successive energization by said source; means for connecting said devices to said source successively and for predetermined welding periods desired for the different devices, respectively, said means comprising a plurality of gaseous discharge tubes having a starting electrode, and having main electrodes connected serially with said source and with the respective devices, one such tube being the first and another being the last in the series, a plurality of capacitances being individually connected between corresponding main electrodes of the successive tubes from the first to the last in the series, said corresponding main electrodes being also connected to one end of the respective welding transformer primaries, means providing bias potential on the respective starting electrodes, normally preventing conduction in said tubes, timing means comprising a source of starting pulses connected to the respective starting electrodes and adapted to start conduction in the tubes in successive order with predetermined timed relationship, commencing with the first and continuing to the last tube in the series, conduction in any one tube, from the first to the next-to-last in the series, charging the capacitance connected between it and the succeeding tube in the series, whereby the starting of conduction in such succeeding tube extinguishes conduction in said one tube through said charged capacitance and whereby said capacitance provides a path for discharge of self-inductance energy in the transformer connected to said one tube, and means operable to extinguish conduction in the last tube in the series at a predetermined time following initiation of conduction in such last tube.

9. The welding apparatus combination defined in claim 8, wherein the last-mentioned means, operable to extinguish conduction in the last tube in the series, comprises in part a capacitance connected between the corresponding main electrodes of the first and last tubes in the series, and in part the first tube itself and the timing means starting conduction in said first tube to initiate a succeeding welding sequence, as in the case of the other tubes in the series.

10. The welding apparatus combination defined in claim 8, wherein the last-mentioned means, operable to extinguish conduction in the last tube in the series, comprises a capacitance connected at one end to said corresponding main electrode of the last tube in the series, means connected to the opposite end of said capacitance and maintaining the same normally at a substantially constant potential during the period of conduction in said last tube, whereby said capacitance becomes charged during such period, and conductive means operable at a predetermined time following initiation of conduction in said last tube to materially and abruptly change the potential at said opposite end of the capacitance and thereby at said last tube's corresponding electrode in a sense and by an amount to extinguish conduction therein, said conductive means thereafter permitting flow of current therein through said capacitance by discharge of self-inductance energy stored in the last transformer.

11. The sequence welding apparatus defined in claim 8, and indicator means connected to the welding current source and operable to indicate flow of welding currents from said source to the different devices, whereby qualtiy control comparisons may be made between the operation of said devices.

12. In a sequence welding apparatus comprising a plurality of separate welding circuit devices serially arranged to produce successive welds in work, and a direct current source of welding current, said devices being adapted for successive energization by said source; means for connecting said devices to said source successively and for predetermined welding periods desired for the different devices, respectively, said means comprising a plurality of gaseous discharge tubes having a starting electrode, and having main electrodes connected serially with said source and with the respective devices, one such tube being the first and another being the last in the series, means providing bias potential on the respective starting electrodes, normally preventing conduction in said tubes, timing means comprising a source of starting pulses connected to the starting electrode of at least the first tube in the series and adapted to start conduction therein, means for initiating conduction in the other tubes in the series in successive order thereafter with predetermined timed relationship, means connected to corresponding main electrodes of the respective tubes from the first to the next-to-last and operable to change the potential thereof in a sense and by an amount extinguishing conduction in each such tube substantially instantly upon initiation of conduction in the next succeeding tube, and means connected to the last tube in the series and operable to extinguish conduction therein at a predetermined time following initiation of conduction in such last tube.

References Cited in the file of this patent

UNITED STATES PATENTS

| | | |
|---|---|---|
| 1,183,195 | Heamy | May 16, 1916 |
| 1,499,645 | Dyhr | July 1, 1924 |
| 2,039,851 | Silverman | May 5, 1936 |
| 2,162,530 | Dawson | June 13, 1939 |
| 2,237,103 | Lex | Apr. 1, 1941 |
| 2,305,773 | Hagedorn | Dec. 22, 1942 |